UNITED STATES PATENT OFFICE.

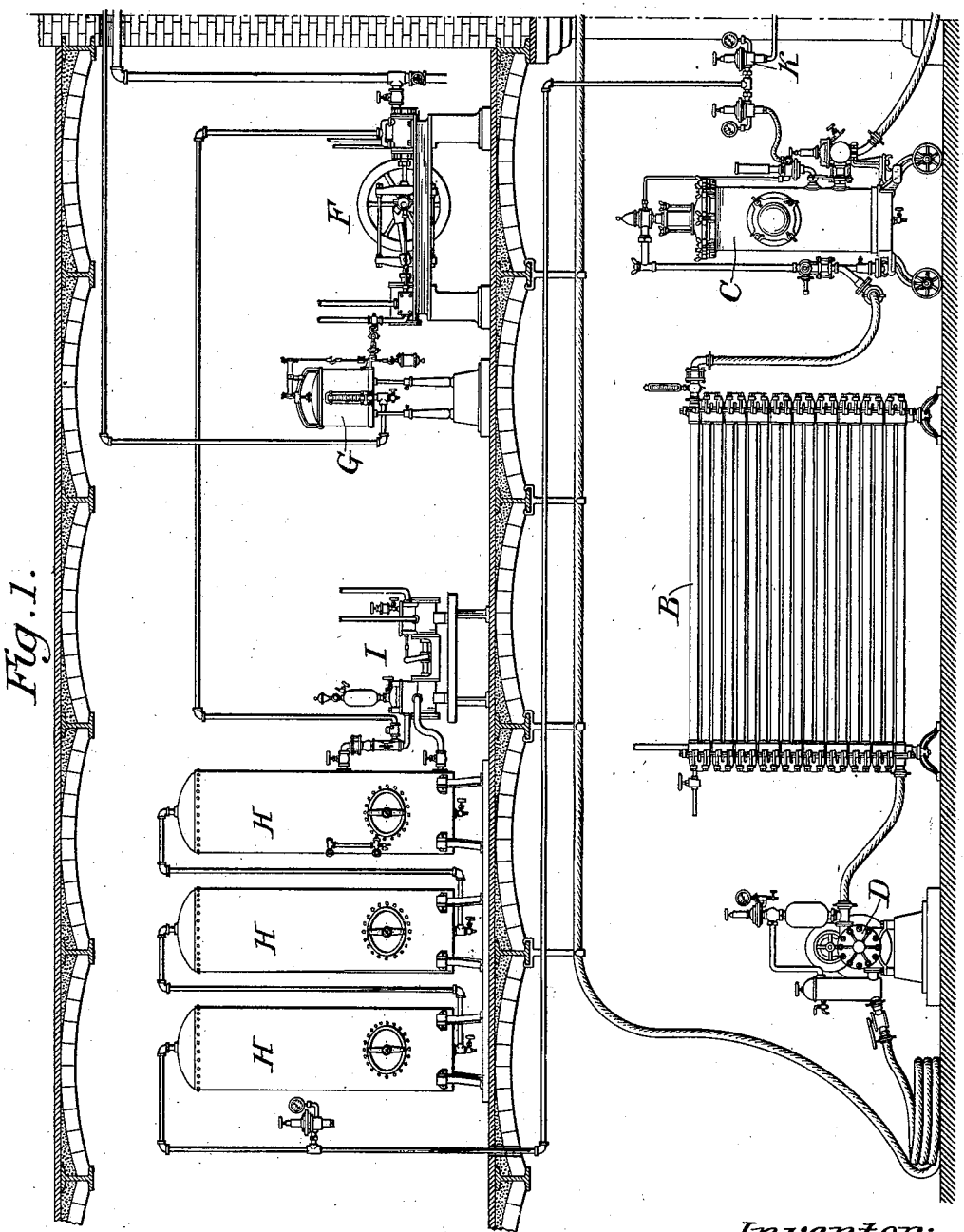

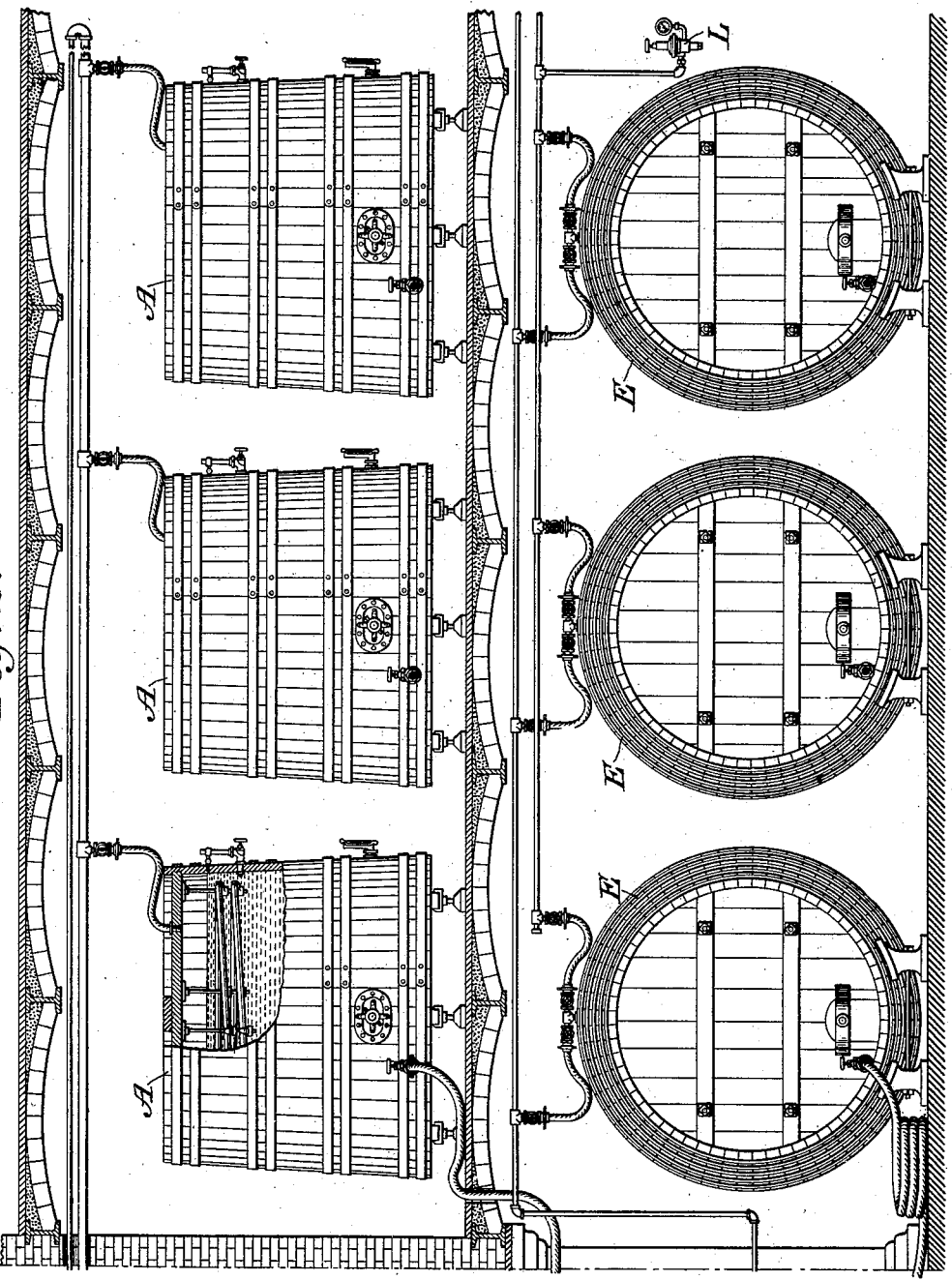

JOSEPH SCHNEIBLE, OF NEW YORK, N. Y.

MANUFACTURE OF MALT LIQUORS.

SPECIFICATION forming part of Letters Patent No. 694,671, dated March 4, 1902.

Application filed May 17, 1900. Serial No. 16,974. (No specimens.)

*To all whom it may concern:*

Be it known that I, JOSEPH SCHNEIBLE, a citizen of the United States, residing in the borough of Manhattan, in the city of New York, State of New York, have invented certain new and useful Improvements in the Manufacture of Malt Liquors, of which the following is a specification, reference being had to the accompanying drawings, forming a part hereof.

This invention relates to the cellar treatment of malt liquors in process of manufacture, and more particularly to the finishing of the same for the market preparatory to the racking off into shipping-packages, and has for its object to shorten the time required for the finishing of malt liquors after the first fermentation is completed without sacrificing quality and without exposing the malt liquor to be finished to any deteriorating influences by contact with atmospheric air and to enable the fermentation and finishing of malt liquors to be completed in two vessels or sets of vessels—namely, the fermenting-tun and the clarifying-cask. The improved method, furthermore, obviates the necessity of repeated pumping of malt liquors while being treated in the cellar, thus preventing material loss of the liquor as well as the cost of operation. It also permits the process of finishing malt liquors for market to be carried on in a minimum cellar-space.

In accordance with the invention the liquor having undergone fermentation for a sufficient period (which in the case of lager-beer is from seven to fourteen days and in the case of ale or porter is from four to seven days) and as soon as the fermentation is sufficiently completed, but while still turbid by reason of the presence of suspended matter, such as yeast, is cooled (either in the fermenting-vat or in a cooling-vat or, preferably, on its way from the fermenting-vat) to a temperature sufficiently below the temperature of the newly-fermented liquor to check the after fermentation, the temperature to which it is cooled being sufficiently low to assist the coagulation of the albuminous matter and to enable the action of the carbonic-acid gas in forming its different combinations to be most advantageous and complete. The liquor thus cooled is charged with carbonic-acid gas to saturation under the conditions of temperature and pressure under which it is to be allowed to rest and is finally allowed to rest under pressure sufficient to prevent separation of the gas from the liquor. This rest period is continued for not less than twelve to twenty-four hours to permit the carbonic-acid gas to enter into and effect its different combinations and is preferably continued long enough to allow the liquor to free itself by precipitation from yeast and coagulated albuminous and other suspended matter.

The temperature to which the newly-fermented liquor should be cooled will be determined by the quality of the material used and by the mashing and fermenting process and yeast employed, as is well understood in the art. The amount of carbonic-acid gas with which the liquor is charged will depend upon the temperature and pressure at which the liquor is to be rested in the clarifying-cask, it being desirable, however, that the liquor be charged with sufficient carbonic-acid gas to saturate it under the conditions of temperature and pressure maintained during the clarifying process.

The accompanying drawings represent a suitable arrangement of apparatus for practicing the improved method as such apparatus would be adapted for use in a modern brewery, Figures 1 and 2 representing different parts of the same apparatus.

For purposes of explanation the improved method will now be described with reference to the drawings.

The fermentation of the liquor is carried on to the desired degree in suitable fermenting-tuns A, which are preferably closed, whereby the liquor is kept from possible infection and whereby the gas of fermentation may be collected to be used in the final charging of the liquor if desired. From the fermenting-tuns the liquor is conducted to a cooler B, wherein the temperature is reduced to a degree sufficiently below the temperature of fermentation to check the after fermentation and to be suitable for the subsequent charging and clarification, (the temperature varying, as is well understood by those skilled in the art, according to the material used and the mashing process and the yeast employed.) From the cooler the liquor is conducted to a carbonator C, wherein the gas in sufficient quantity to saturate the liquor under the conditions of temperature and pressure maintained during clarification is introduced into and absorbed by the liquor. The cooler and carbonator may be of any suitable kind, and it is immaterial so far as this invention is concerned whether the gas is introduced into the liquor before, after, or during the cooling. A pump D may be introduced into the system at any convenient point for the purpose of inducing the proper movement of the liquor if necessary. After being cooled and carbonated the liquor passes to the clarifying-casks, (represented at E,) wherein it is allowed to rest for a period of not less than twelve to twenty-four hours under a pressure sufficient to prevent separation of the gas until the carbonic acids by its chemical action enters into and effects its different combinations. This period of rest is preferably prolonged sufficiently to allow the yeast and coagulated albuminous and other suspended matter to precipitate. In practice it is found desirable to facilitate the precipitation of the yeast and coagulated albuminous and other suspended matter by the use of isinglass and chips or other usual means for facilitating precipitation. By maintaining pressure sufficient to prevent separation of the gas from the liquor sufficient gas may be retained to make the clarified liquor marketable, the pressure to be maintained varying with the character of the product and the requirement of the trade, as is well understood by those skilled in the art. More gas, however, may be added, if desired, during the racking process.

The drawings illustrate provisions for charging the liquor before clarification with gas collected from the fermenting vessels, and although such provisions are not necessary incidents of the improved method herein sought to be covered they will be briefly described, as they form part of the complete plant or system. The gas from the fermenting vessels A is conducted to a compressor F, to which is connected a regulating device G, so that there shall be no interference with the predetermined conditions of fermentation. The compressed gas is received in suitable tanks H, in which it may be washed, if necessary, a pump I being shown as connected to one of the tanks H for this purpose. From the tanks the gas is delivered to the carbonator C, by which it is introduced into the liquor.

For convenience in maintaining the desired pressure in the clarifying vessels they may be connected, as represented in the drawings, by a line of pipe and a suitable regulator K with the gas-supply, whereby the gas may be admitted to the clarifying vessels to compensate for possible leakage and maintain the proper pressure. In order that the pressure within the clarifying vessels may be relieved as the gas or air is displaced by the inflowing liquor, such vessels may also be connected with a regulating relief-valve L.

The form, kind, and arrangement of the apparatus employed are obviously immaterial so far as the improved method is concerned, it being understood that the liquor is cooled below the temperature at which fermentation took place, is charged to saturation, and is clarified while the chemical action of the carbonic-acid gas upon the different matters in the liquor takes place and while the cooled and charged liquor is resting under such conditions as to prevent separation of the gas through material rise of temperature or decrease of pressure, which would interfere with clarification. In practice it is found that when the manufacture of malt liquor is carried on in accordance with the improved method the separation of albuminoids is not only more complete than could be effected by any process of ordinary storage or filtration, but the product is much more stable and not as much subject to deterioration as in liquor treated by any of the usual methods. The carbonic-acid gas by its chemical action while forming combinations with other matters assists in the rapid and complete coagulation of the albuminous matters, and thereby in this facilitates their complete separation by precipitation or otherwise.

If newly-fermented beer after being cooled is stored in an undersaturated condition as in the old method of resting beer, the clarification proceeds very slowly on account of the dificiency in carbonic-acid gas, and the addition of young fermenting beer is often necessary to supply the deficiency of gas before the beer can be made fit for the market. By the improved method complete separation of the yeast and coagulated albuminous and other suspended matters may be more completely effected in five days or more, according to the quantity of liquor treated, leaving it in a finished and immediately marketable condition.

I claim as my invention—

1. The improvement in the manufacture of malt liquors, which consists in cooling newly-fermented liquor, charging the liquor, subsequent to its withdrawal from the fermenting-vat, with carbonic-acid gas to saturation under the conditions of temperature and pressure maintained on the cooled and charged liquor, and resting the liquor so cooled and charged until coagulation of the albuminous matters is effected; substantially as described.

2. The improvement in the manufacture of malt liquors, which consists in cooling newly-fermented liquor, charging the liquor with carbonic-acid gas to saturation under the conditions of temperature and pressure maintained on the cooled and charged liquor, resting the liquor so cooled and charged until coagulation of the albuminous matters is effected, and separating the coagulated matter from the liquor, substantially as described.

This specification signed and witnessed this 10th day of May, A. D. 1900.

JOSEPH SCHNEIBLE.

In presence of—
A. N. JESBERA,
W. B. GREELEY.